United States Patent [19]

Boddie

[11] Patent Number: 4,659,748
[45] Date of Patent: Apr. 21, 1987

[54] METHOD AND COMPOSITION FOR REPAIRING CEMENTITIOUS SURFACES

[75] Inventor: Carl E. Boddie, Houston, Tex.

[73] Assignee: Industrial Polymers, Inc., Houston, Tex.

[21] Appl. No.: 808,250

[22] Filed: Dec. 12, 1985

[51] Int. Cl.⁴ ............................................. C08G 18/14
[52] U.S. Cl. ..................................... 521/170; 521/172; 521/173; 521/174; 521/176; 404/67; 404/69; 404/75; 404/78
[58] Field of Search ............... 521/170, 172, 173, 174, 521/176; 404/67, 69, 75, 78

[56] References Cited

U.S. PATENT DOCUMENTS

| | | | |
|---|---|---|---|
| 3,723,163 | 3/1973 | Schumacher | 528/59 |
| 4,139,676 | 2/1979 | Janssen et al. | 428/402 |
| 4,275,172 | 6/1981 | Barth et al. | 521/122 |
| 4,567,708 | 2/1986 | Haekkinen | 404/78 |

Primary Examiner—Maurice J. Welsh
Attorney, Agent, or Firm—Burns, Doane, Swecker & Mathis

[57] ABSTRACT

An improved method and composition for repairing cementitious surfaces is provided. A polymerizable urethane composition having an excess of isocyanate groups to account for water present in the reaction environment is utilized. The method utilizes water, e.g. surface moisture, to foam the polymer and provide a long-lived repair of the surface. The method is particularly applicable in the repair of concrete roadways.

12 Claims, No Drawings

METHOD AND COMPOSITION FOR REPAIRING CEMENTITIOUS SURFACES

BACKGROUND OF THE INVENTION

1. Field of the Invention

The present invention relates to a method for repairing cementitious surfaces and, in particular, to repairing concrete surfaces. The present invention also relates to polymerizable compositions for repairing such surfaces and, more particularly, to polymerizable urethane compositions useful in repairing such surfaces.

2. Description of the Prior Art

With the ever increasing amount of traffic on roads and highways it has been found increasingly important to effect quick and efficient road repairs which will have a long service life. Various polymeric compositions have long been used as sealants and crack fillers for structural and road surface concrete. However, many of these compositions have been found better suited for repairing traditional materials, such as asphalt solvent systems. There have been attempts to repair cement or concrete surfaces with urethane compositons. For example, U.S. Pat. No. 3,723,163 discloses a one-part urethane composition for sealing cracks in cement surfaces and U.S. Pat. No. 4,275,172 discloses urethane formulations which are frothed with an inert gas and which are applicable to patching concrete.

A problem arises in the use of urethane compositions, however, as there is a tendency for bubbles to form in the polyurethane. This bubble formation is caused by the reaction of the polyurethane prepolymer or monomer isocyanate groups when water is present in the surface to be repaired. The art attempts to reduce this bubble formation or foaming by minimizing the amount of water present which can react with the isocyanate groups.

It is thus seen that although polymeric compounds have long been used as sealants and crack fillers, there have been problems associated with the use of quick-setting urethane compositions for concrete surfaces because such compositions are very reactive with water. The problems are especially exacerbated when concrete or cement is to be repaired because of the porous nature of the substrate, which may contain relatively large amounts of water.

In an attempt to overcome these problems of using polymerizable urethane compositions in the presence of water, the art has attempted, for example, to utilize water absorbing materials to offset the reaction of the isocyanate groups with water. This method has been suggested in the aforementioned U.S. Pat. No. 4,275,172. Another method for offsetting this reaction is to prime the surface to be repaired, such as suggested by the aforementioned U.S. Pat. No. 3,723,163. Even when the art utilizes an isocyanate-water reaction, it has been found beneficial to minimize foaming. For example, U.S. Pat. No. 4,139,676 discloses the consolidation of an aggregate material by means of an isocyanate-terminated prepolymer. Yet even though the isocyanate terminated prepolymer reacts with water present in the aggregate, the patent discloses the desire to minimize foaming by using an aggregate having a low moisture content.

The problems encountered in using these urethane systems are due to the extremely reactive nature of such compositions with water. Water contamination of these systems, e.g., due to the presence of surface moisture, often leads to a degradation of the polymer matrix structure and a shortening of the polymeric chains. These effects lead to a polymer matrix having a reduced tensile strength and reduced elasticity, thereby resulting in an early failure of the repair. A polymeric system which can overcome these problems would be a most useful and welcome system in the art.

In view of the foregoing, it is an object of the present invention to provide a method and composition for repairing cementitious surfaces which constructively utilizes water present in the polymerization reaction environment.

It is a further object of the present invention to provide repairs of cementitious surfaces which have a longer service life than those previously used.

It is also an object of the present invention to provide repairs of cementitious surfaces with compositions which foam during polymerization due to water present in the reaction environment.

It is yet another object of the present invention to provide such foams for repairing cementitious surfaces which maintain full tensile and bonding strength and which retain elas- ticity.

It is still another object of the present invention to provide such foams which are useful in repairing cementitious surfaces in the absence of moisture absorbing materials.

These and other objects as well as the scope, nature and utilization of the invention, will be apparent to those skilled in the art from the following description and the appended claims.

SUMMARY OF THE INVENTION

In accordance with the foregoing objectives, the present invention provides a composition useful in repairing a cementitious surface consisting essentially of (a) a polyol having reactive hydroxyl groups and (b) a polyisocyanate having reactive isocyanate groups wherein the reactive isocyanate groups are present in the composition in an amount ranging from about 1% to 20% in excess of a stoichiometric equivalent amount of the reactive hydroxyl groups. In preferred aspects of the present invention, the stoichiometric excess of isocyanate groups to hydroxyl groups is from about 1% to about 10%.

Also in accordance with the foregoing objectives, the present invention provides a method for repairing a fault in a cementitious surface, comprising injecting into the fault a composition comprising (i) a polyol having reactive hydroxyl groups and (ii) a polyisocyanate having reactive isocyanate groups, wherein the reactive isocyanate groups are present in the composition in an amount ranging from about 1% to about 20% in excess of a stoichiometric equivalent amount of the reactive hydroxyl groups, and allowing the composition to react so as to form a foamed polymeric matrix. Preferably, the fault is cleaned prior to injection of the composition and the foaming composition is leveled to provide a smooth surface.

The term "cementitious" as used herein for purposes of the present invention connotes any of a variety of materials comprising various hydraulic cements as well as various concrete formulations. The term "foamed polymeric matrix" as used herein for purposes of the present invention means the final cured, polymerized and foamed polymeric matrix, as opposed to the reacting composition, which is foamed due to carbon dioxide release, polymerizing, and hardening. A "stoichiometric excess" as used herein is meant to denote an excess of reactive moieties based on stoichiometric ratios.

DETAILED DESCRIPTION OF THE PREFERRED EMBODIMENTS

The present invention generally relates to polymerizable urethane compositions useful in repairing cementitious surfaces. In the present invention, the urethane compositions foam due to the presence of water in the reaction environment. The compositions are two part formulations comprising polyisocyanates and polyols.

The two component urethane compositions of the present invention comprise a polyol having reactive hydroxyl groups and a polyisocyanate having reactive isocyanate groups. When these two components are reacted, a polyurethane is formed via reaction of the isocyanate groups with the hydroxyl groups. However, when water is present in the reaction environment, such as by the presence of surface moisture, there is a reaction between the isocyanate groups and the water which competes with the formation of the polyurethane. This competing reaction forms carbon dioxide gas and transforms the isocyanate groups into amine groups. The resultant amine groups react with other isocyanate groups to form urea linkages. The carbon dioxide evolved from the competing water/isocyanate reaction acts to foam the polymer matrix, thereby causing the matrix to fill irregular shapes and voids within the surface fault.

Thus, in the instant invention, water present in the reaction environment is constructively utilized to foam the polymer and to provide urea linkages. Such water may be bound in a porous cementitious surface or be present as surface moisture in the fault. The foaming is beneficial in that it causes the polymer matrix to expand and fill the fault to be repaired.

The urethane formulations of the present invention have a stoichiometric excess of reactive isocyanate moieties to account for water present in the fault and thereby foam, and also to account for the amine groups formed during the reaction with water and provide urea linkages which aid in binding the polymer to the concrete surface. The amount of reactive isocyanate groups or moieties present in these formulations is from about 1% to about 20% in excess of a stoichiometric equivalent amount of the reactive hydroxyl groups, and preferably from about 1% to about 10% in excess of the reactive hydroxyl groups.

Because the urethane formulations of the present invention are particularly useful for repairing cementitious roadways, the amount of water present in the ambient atmosphere at a given temperature, i.e., the relative humidity, will influence the amount of reactive isocyanate groups needed. For example, in tropical environments where extremely high humidity conditions exist, a larger stoichiometric excess of reactive isocyanate may be required. In essence, the more water present in the atmosphere, the more reactive isocyanate groups will be consumed in the competing isocyanate/water reaction. In general, though, it has been found that a stoichiometric excess of about 1 to 20% is sufficient for the present invention to be used in most of the climates found in the continental United States.

Any of a wide variety of organic polyisocyanates may be employed in the reaction, including aromatic, aliphatic and cycloaliphatic polyisocyanates and combinations of these types. Examples of suitable aromatic polyisocyanates include 2,4-toluene diisocyanate, mixtures thereof with 2,6-toluene diisocyanate, methylene bis(4-phenylisocyanate), m-phenylene diisocyanate, 3,3'-dimethyl-4'-diphenylene diisocyanate, 3,3'-dimethoxy-4,4'-bisphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate, and triisocyanato meta-terphenyl. The polyisocyanates may contain other substituents, although those which are free from reactive groups other than the isocyanate groups are ordinarily preferred. In the case of the aromatic compounds, the isocyanate groups may be attached either to the same or to different rings. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate are suitable as are such alicyclic compounds as 1,2-and 1,4-cyclohexylene diisocyanates, 4,4'-methylene-bis(cyclohexylisocyanate), and triisocyanato cyclohexane. The most preferred polyisocyanates include methylene bis(4-phenylisocyanate), and particularly those which have a molecular weight range of from about 301 to about 370.

It is especially preferred that blends of these isocyanates be used. A preferred blend includes 2,4-toluene diisocyanate and methylene bis(4-phenylisocyanate). Examples of commercial proprietary blends which are preferred include Mondur ® E-448, which has a functionality of 2.3–2.9 and is available from Mobay Chemical Corp., and PAPI ® 901, which has an average functionality of 2.3 and is available from the Upjohn Co. It is preferred that the blends of polyisocyanates used have an average functionality of greater than two.

The organic compounds which react with the polyisocyanates are hydroxyl-terminated polyols. Typical polymer backbones include certain polyethers. Illustrative polyethers are the following: poly(oxy-propylene) glycols, poly(oxypropylene)poly(oxyethylene) copolymers wherein the poly(oxyethylene) is less than about 30% by weight of the backbone, and poly(oxytetramethylene) glycols. Exemplary hydroxyl terminated polyesters are polyethylenepropylene adipate, polyethylene adipate, polyethylene adipate (70)-phthalate (30), and polyneopentyl sebacate. Exemplary fatty acid triglycerides include castor oil and glyceryl trihydroxyoleate. Exemplary short chain diols include ethylene glycol, propylene glycol, 1,4-butanediol, and 1,2-hexylene glycol. Various alicyclic polyols can also be employed. In general, the most suitable polyesters have melting points of about 15° C. or lower. Preferred polyols include polyethers and glyceryl trihydroxyoleate, and particularly those which have a molecular weight of from about 90 to about 6500.

It is preferred that the polyols have a functionality of at least two, such as the glyceryl trihydroxyoleate or the castor oil, which has a functionality of three. Similar to the polyisocyanates, blends of polyols can be used. A preferred blend comprises castor oil and 1,4-butanediol.

A catalyst may be employed in the reaction to form the polymer. Suitable catalysts include tertiary amines, such as dimethylcyclohexyl amines, triethylamine, 1,2,4-trimethylpiperazine or heavy metal compounds soluble in the reaction system such as iron-acetoacetate and dibutyltin dilaurate.

Catalysts, if employed, are generally present to the extent of from about 0.001% to about 0.004% by weight of the total weight of the reactants, preferably about 0.002% by weight. For moisture curable polymers such as those of the present invention, dibutyltin dilaurate and bicyclo tertiary amines represent the preferred catalysts.

The reaction time necessarily will vary depending on the kind, amount and molecular weight of the monomeric reactants and the type of catalyst employed, if any. Generally, at a temperature of between 24° C. and 32° C., a reaction time of between 1 and 5 minutes is employed.

The method of the present invention comprises injecting a reactive composition into a cementitious fault and allowing the composition to react and form a foamed polymeric matrix. The composition injected comprises (i) a polyol having reactive hydroxyl groups and (ii) a polyisocyanate having reactive isocyanate groups, wherein the reactive isocyanate groups are present in an amount of from about 1% to 20% in excess of a stoichiometric equivalent amount of the reactive hydroxyl groups, and preferably from about 1% to 10% in excess of the reactive hydroxyl groups.

As heretofore mentioned, cementitious surfaces may be relatively porous, and retention of water by a cementitious surface and possibly also by the underlying strata leads to early failures of the aforementioned prior art polymeric repairing systems. However, the present invention overcomes the problems associated with the presence of water in the reaction environment and actually utilizes it to the advantage of the present invention. Moreover, the present invention accomplishes the repair of a fault in the presence of water without the need to use hydroscopic materials. Where the presence of water led to an early failure of prior art repairs, the present invention, in its utilization of from about 1 to 20% of a stoichiometric excess of isocyanate groups, constructively uses water present in the reaction environment to foam the reacting composition, thus causing it to fill voids and irregular surfaces present in the fault, and also to form amine groups which react with isocyanate groups to form urea linkages, thereby improving the strength of the foamed polymeric matrix and providing a better repair.

Upon injecting the above-described composition into a fault and allowing the composition to react to thereby produce a foamed polymeric matrix, the isocyanate groups react with water present in the fault to produce carbon dioxide and amine groups. The carbon dioxide causes the polymerizing composition to foam and thereby fill voids and irregular surfaces within the fault. The amine groups formed further react with other isocyanate groups to form urea linkages in the foaming matrix, thereby adding more strength to the repair.

It is preferred that the fault to be repaired be cleaned of particles and debris to aid in adhesion of the foamed matrix to the cementitious surfaces. It is most preferred that the cleaning comprises the use of a high pressure water jet followed by a high pressure air jet. Both the water jet and the air jet aid in removing debris from the fault, and the air jet also acts to partially dry the fault. It is, of course, not necessary to completely dry the fault, as the present invention constructively utilizes water present in the reaction environment. It is also preferred that excess foam overflowing from the fault be removed, hence leveling the fault before the foamed polymeric matrix is fully formed. In practical situations, the present invention may be carried out at ambient temperatures of from about 20° C. to about 32° C. The matrix is fully polymerized and hardened in about 3 to 5 minutes, and is cured, i.e., is suitable for use in traffic, in about 15 minutes when a suitable catalyst is employed. The polymeric matrix is fully cured in about 24 hours.

The compositions of the present invention can further comprise various materials known to skilled artisans. Extenders, such as dioctylphthalate, diisodecylphthalate, or aromatic oils can be present, generally in amounts of up to 20% by weight. Similarly, various pigments or fillers can be present.

The invention which is intended to be protected herein is not to be construed as limited to the particular forms disclosed. The above preferred embodiments and examples are given only to illustrate the spirit of the instant invention. Other embodiments and examples within the scope and spirit of the present invention are also within the contemplation of this invention, and variations and changes may be made by those skilled in the art without departing from the spirit of the present invention.

What is claimed is:

1. A method for repairing a fault in a cementitious surface, comprising the steps of:
   (a) injecting into the fault a reactive composition comprising:
      (i) a polyol having reactive hydroxyl groups, and
      (ii) a polyisocyanate having reactive isocyanate groups wherein the reactive isocyanate groups are present in the composition in an amount of from about 1% to about 20% in excess of a stoichiometric equivalent amount of the reactive hydroxyl groups, and
   (b) allowing the composition to react in the presence of water so as to produce a foamed polymeric matrix.

2. The method as defined by claim 1 wherein the reactive isocyanate groups are present in an amount of from about 1% to about 10% more than a stoichiometric equivalent amount of the reactive hydroxyl groups.

3. The method as defined by claim 1 wherein the polyol comprises about 55 weight % of the composition, and is comprised of a mixture of castor oil and 1,4-butanediol.

4. The method as defined by claim 1 wherein the polyisocyanate comprises about 45 weight % of the composition, and is comprised of a mixture of polyisocyanates having an average functionality of greater than two, the mixture comprising toluene diisocyanate and methylene bis(4-phenylisocyanate).

5. The method as defined by claim 1 further comprising the step of cleaning the fault prior to said injecting step.

6. The method as defined by claim 5 wherein said step of cleaning comprises washing the fault with a stream of water and drying the fault with a stream of air.

7. The method as defined by claim 1 further comprising the step of removing excess polymer to form a level surface subsequent to said step of allowing the composition to react.

8. A composition useful in repairing a cementitious surface consisting essentially of (a) a polyol having reactive hydroxyl groups and (b) a polyisocyanate having reactive isocyanate groups, wherein the reactive isocyanate groups are present in the composition in an amount of from about 1% to about 20% in excess of a stoichiometric equivalent amount of the reactive hydroxyl groups.

9. The composition as defined by claim 8 wherein the reactive isocyanate groups are present in an amount of from about 1% to about 10% in excess of a stoichiometric equivalent amount of the reactive hydroxyl groups.

10. The composition as defined by claim 8 wherein the polyol comprises about 55 weight % of the composition, and is comprised of a mixture of castor oil and 1,4-butanediol.

11. The composition as defined by claim 8 wherein the polyisocyanate comprises about 45 weight % of the composition, and is comprised of a mixture of polyisocyanates having an average functionality of greater than two, said mixture comprising toluene diisocyanate and methylene bis(4-phenylisocyanate).

12. A method for repairing a fault in a cementitious surface, comprising:

injecting into the fault a reactive composition consisting essentially of
  (i) a polyol having reactive hydroxyl groups and comprising a mixture of castor oil and 1,4-butanediol, and
  (ii) a polyisocyanate having reactive isocyanate groups and comprising a mixture of toluene diisocyanate and methylene bis(4-phenylisocyanate), wherein reactive isocyanate groups are present in the reactive composition in an amount of from about 1% to about 20% in excess of a stoichiometric equivalent amount of the reactive hydroxyl groups,
and then allowing the reactive composition to react in the presence of water so as to produce a foamed polymeric matrix.

* * * * *